United States Patent Office 3,435,972
Patented Apr. 1, 1969

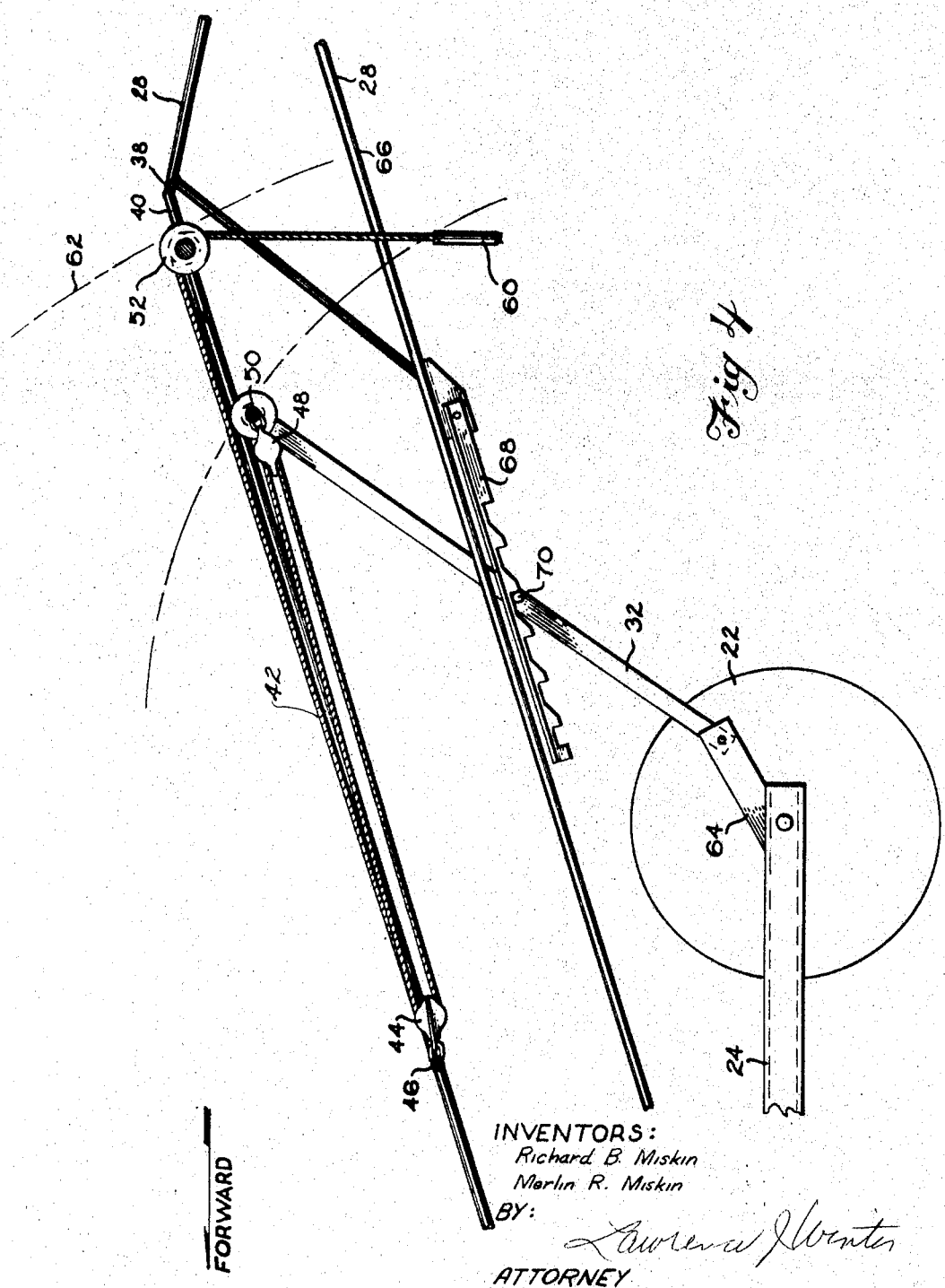

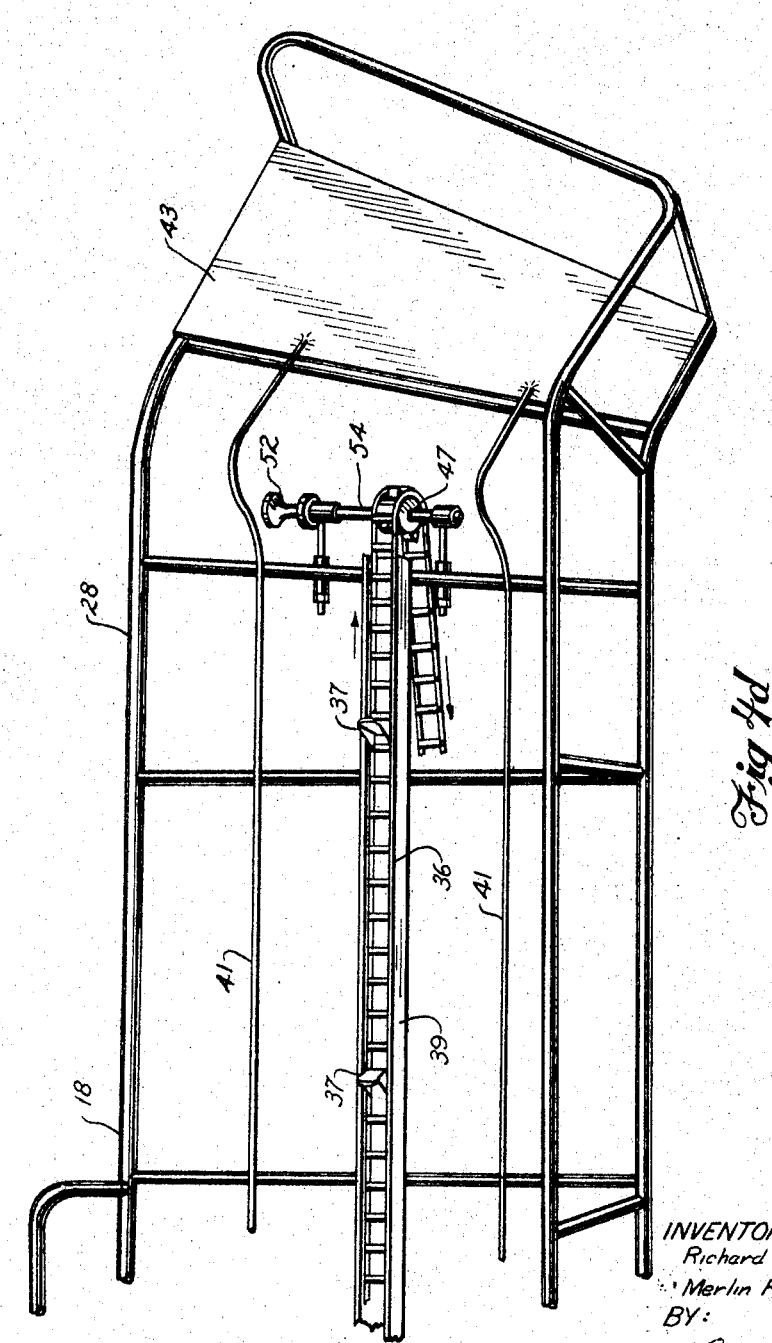

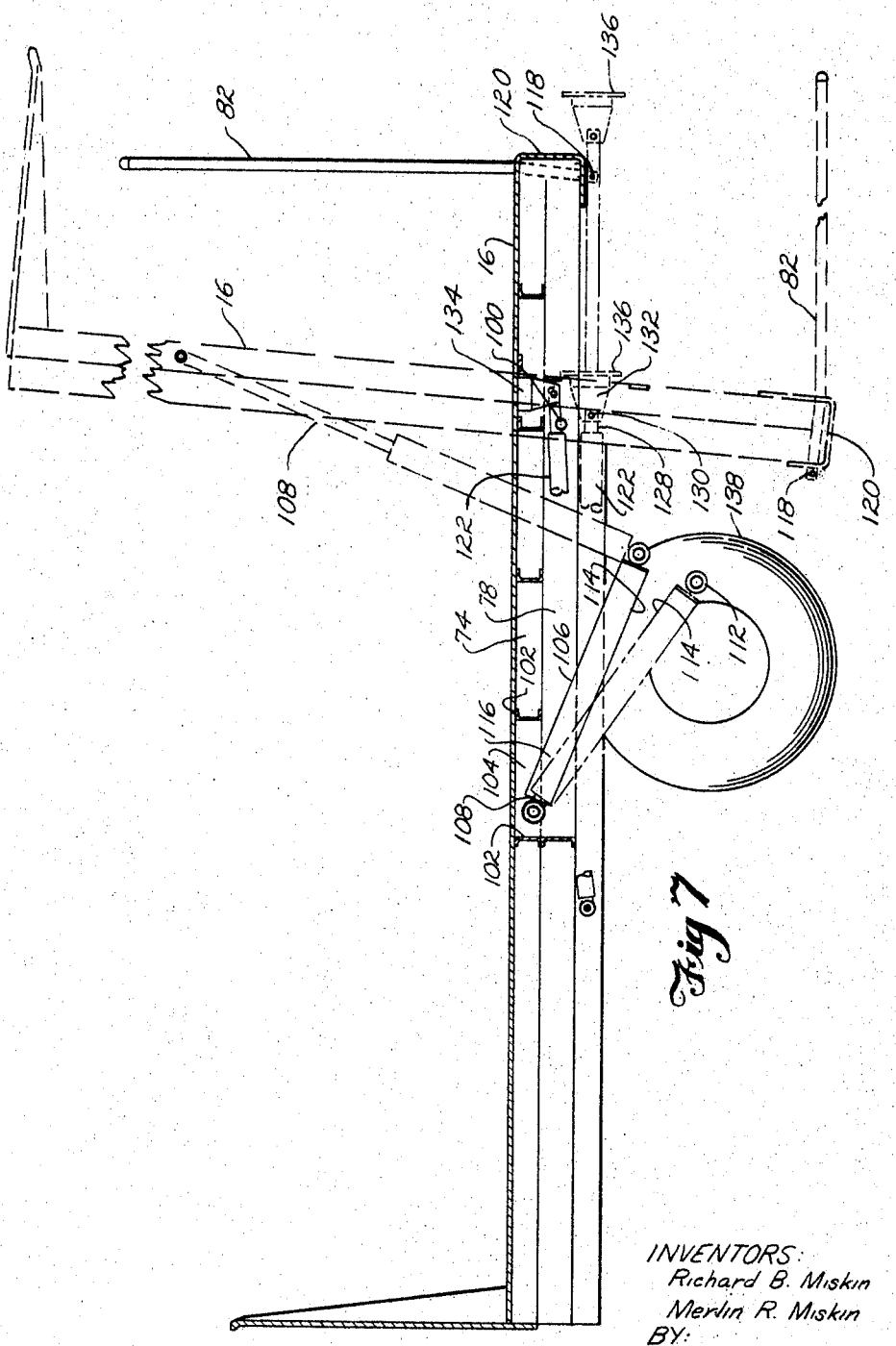

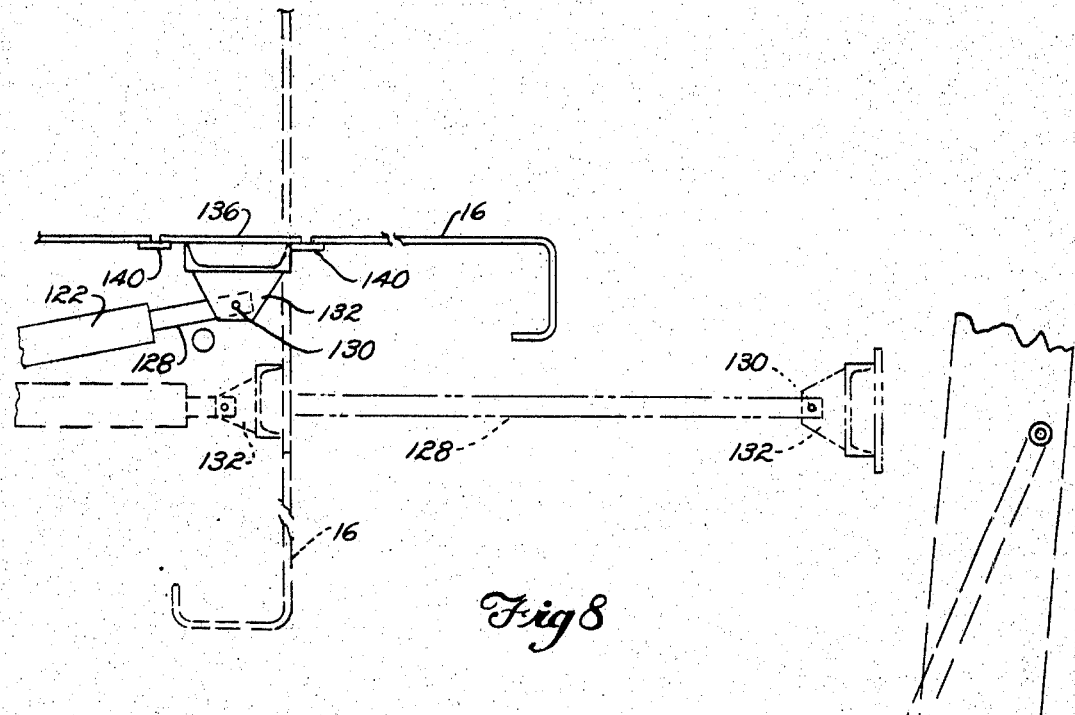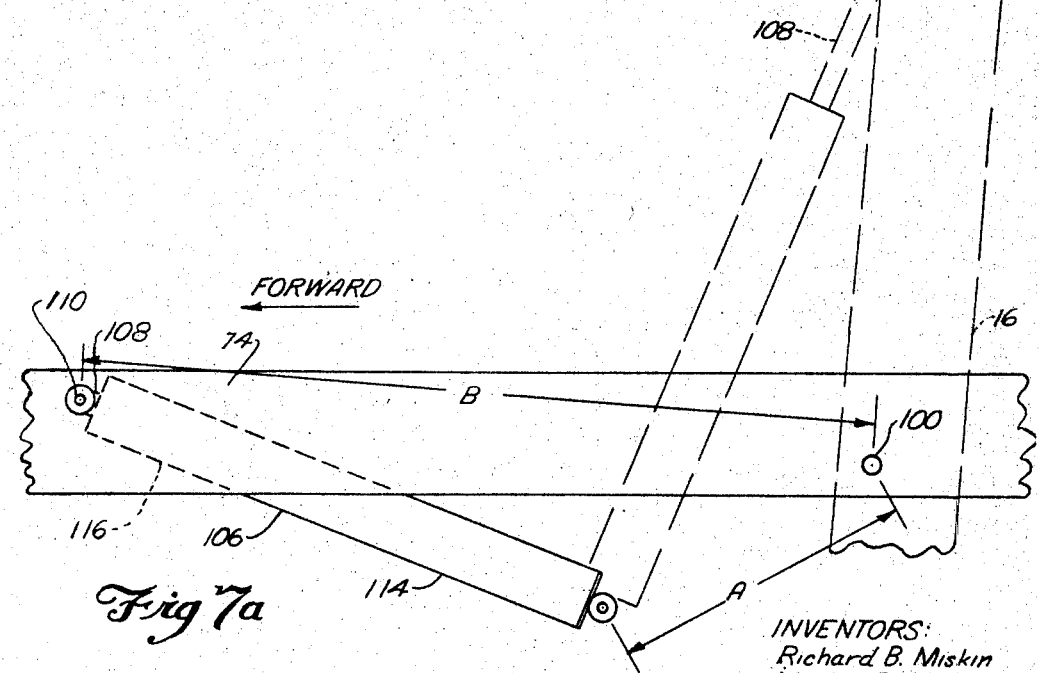

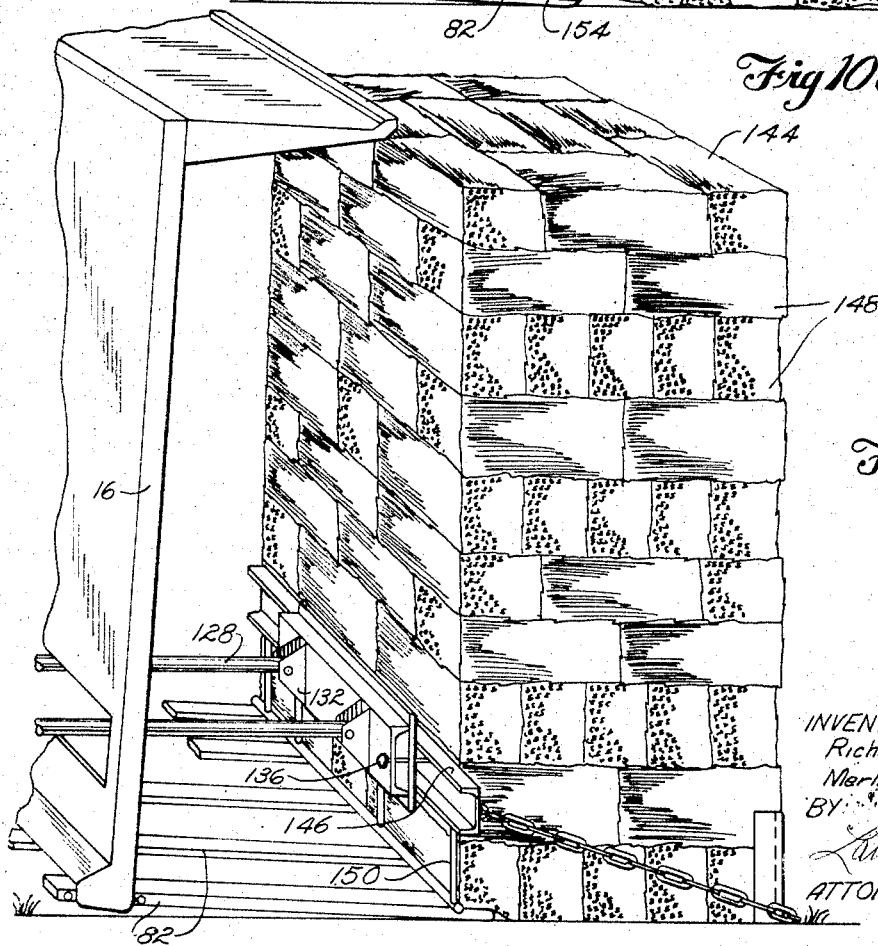

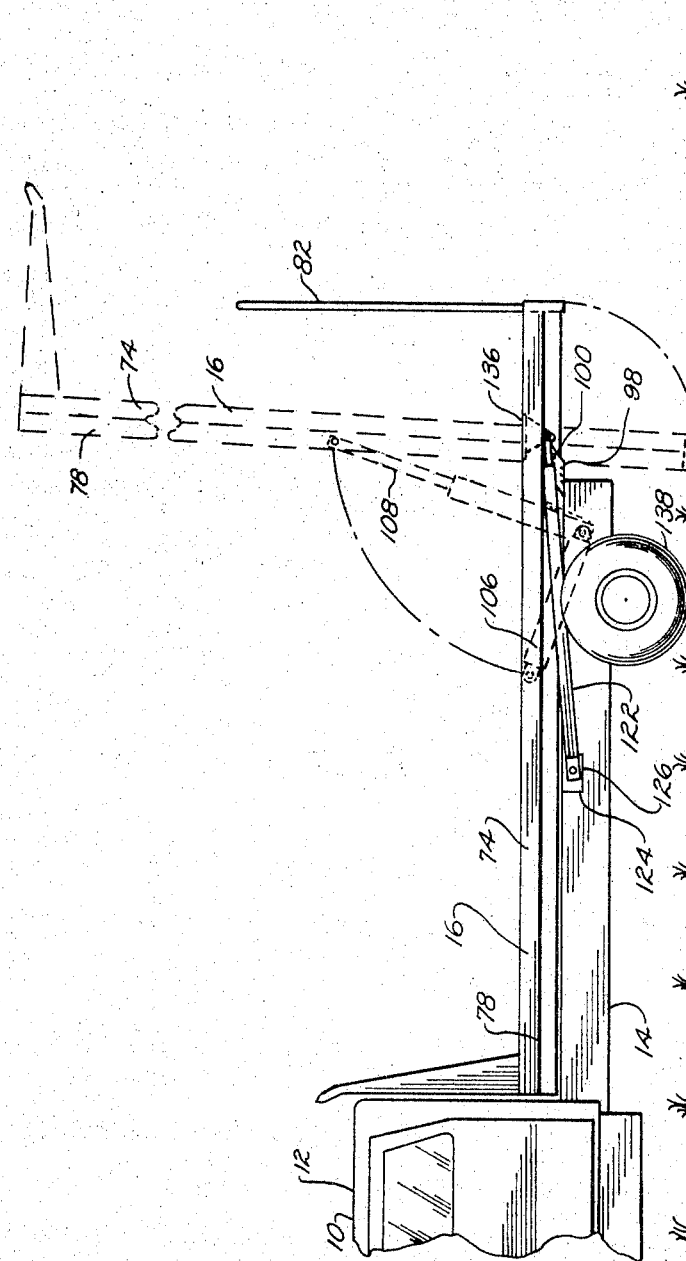

3,435,972
BALE HANDLING SYSTEM
Richard B. Miskin, Miskin Bldg., Ucon, Idaho 83454, and Merlin R. Miskin, Rte. 2, Box 194, Idaho Falls, Idaho 83401
Application Jan. 23, 1967, Ser. No. 610,977, which is a division of application Ser. No. 379,128, June 30, 1964. Divided and this application May 10, 1967, Ser. No. 610,714
Int. Cl. B60p 1/36; B66f 9/06
U.S. Cl. 214—501                            6 Claims

ABSTRACT OF THE DISCLOSURE

A vehicle for transporting baled products comprising a chassis with longitudinal members and a horizontal platform support thereon with a rearwardly extending bracket means on the chassis and pivot means connecting the platform to the chassis and hydraulic means for rotating the platform from a horizontal position to a position substantially beyond a vertical plane with respect to the horizontal platform. The vehicle is further provided with spaced opening means for selectively connecting the rear end of the hydraulic means to the chassis at alternate positions and the vehicle is further provided with hydraulic pusher means for pushing material off of the platform and retriever means for retrieving material onto the platform.

The present invention relates to bale handling systems, and more particularly to such systems for handling baled products, such as baled hay and the like.

This is a division of Ser. No. 610,977 filed Jan. 23, 1967, which is a division of Ser. No. 379,128 filed June 30, 1964, now abandoned.

It is another object of the present invention to provide a combination of a loader device which can convey individual baled products from a ground surface for loading upon the bed of a vehicle and the vehicle can discharge the completely loaded bed when desired.

It is another object of the present invention to provide a bale loader conveyor that can be utilized with a dump truck vehicle and in which the conveyor can be adjusted to any desired working height so that the bales of hay conveyed to the truck bed are disposed at the optimum height for easy handling.

Another object of the present invention is to provide a loader conveyor for use with a dump truck vehicle that is provided with revolving toothed discs means for getting or picking up individual bales and getting them started riding upon the loader conveyor.

Another object of the present invention is to provide a loader conveyor for picking up individual bales of hay and the like from the ground for riding them up adjacent the platform of a dump truck vehicle, in which the loader conveyor is provided with windlass means including a block and tackle assembly for adjusting in a vertical direction one end of the loader conveyor so as to raise the loader conveyor as required in order to dispose it at the best height for easy handling of the bales by a person on the vehicle platform.

Another object of the present invention is to provide a bale handling system for loading and stacking baled hay products, straw, and the like, with a minimum of man hours and hand labor.

Another object of the present invention is to provide a bale handling system or apparatus provided with a platform or truck bed that can be installed on an ordinary truck or vehicle.

Another object of the present invention is to provide a truck platform for receiving a plurality of individual bales of hay and the like thereon, which platform is provided with side stakes that are attached to the platform or the truck deck or bed with special clamp means which allows the side stakes to be adjusted at varying widths with respect to each other and with respect to the track bed or platform.

Another object of the present invention is to provide a truck bed or platform for use on a conventional truck or vehicle in which the platform can be tilted for unloading or discharging as a complete unit a stack of baled hay or the like, in which the truck platform is tilted from a substantially horizontal direction through an arc and in a plane, that is substantially vertical with respect to the initial horizontal plane, but is removed therefrom at an angle greater than 90°.

Another object of the present invention is to provide a vehicle having a tilting truck bed or platform that can be tiled from a horizontal position upwardly and rearwardly through an arc that is greater than 90° and beyond the vertical plane from said horizontal plane.

Another object of the present invention is to provide a baled hay product dump truck with a platform that can be tilted from a horizontal plane past the vertical plane, with means to allow the rear stakes to touch the ground when the platform is tipped or tilted past the vertical plane.

Another object of the present invention is to provide a dump truck for stacking baled products with pusher means extending through the platform which pusher means are supported by the paltform and form part of the platform when they are not used to push or discharge a load of baled products from the platform.

Another object of the present invention is to provide a vehicle havnig a tilting platform for loading and discharging a stack of hay therefrom, in which the structure of the sub-frame or part of the truck platform or bed that remains in a fixed position under the paltform, allows relatively low positioning of the platform.

Another object of the present invention is to provide a vehicle having a tiltable platform with rams that can be disposed in alternate positions for lifting or tilting the platform to discharge a load therefrom so that the platform or truck bed can be used for dumping heavier loads without lifting to a vertical position.

Another object of the present invention is to provide a vehicle having a dump bed or platform in which the pivoting point of the platform is located so that the back end of the platform will lightly touch the ground when it is tipped to the dumping or stacking position.

Another object of the present invention is to provide a bale handling system that can be utilized to retrieve or reload a discharged stack of baled products that have previously been stacked and discharged from the vehicle.

Another object of the present invention is to provide ram means that are able to tip or tilt the platform or deck from a loading to a stacking position because of the relative locations of the pivot points, in one stroke.

Various other objects and advantages of the present invention will be readily understood from the following detailed description when considered in connection with the accompanying drawings forming a part thereof, and in which:

FIGURE 4 is a view taken along line 4—4 of FIGURE 3;

FIGURE 4d is a view of the rear end of the loader conveyor, looking down from its left side;

FIGURE 7 is a side elevational view illustrating the truck platform and the ram means shown in solid lines in a loading position, and the platform and ram actuating means shown in dotted lines in the position when the load on the platform is being discharged therefrom;

FIGURE 7a is a view similar to FIGURE 7 and illustrating the relative distances between the front end of the ram actuating means and the rear end of the ram actuating means with respect to the pivot point or the point about which the platform pivots;

FIGURE 8 is a detail view illustrating the push off means disposed in a non-operative position and forming part of the platform, and this view also illustrates the extended position of the push off means when it is moving the haystack from a tilted platform;

FIGURE 9 is a perspective view illustrating the method of retrieving or moving a previously discharged stack of hay back onto the platform for transporting it to another location;

FIGURE 10a is a top plan fragmentary view of the rear stakes on the back of the platform;

FIGURE 10b is a side view of the rear stake shown in FIGURE 10a; and

FIGURE 10c is a side view similar to FIGURE 10b, illustrating the manner in which the stake pushes under a load of hay without catching on the hay stems or digging into the ground during the retrieving operation;

FIGURE 11 is a side elevational view illustrating the general arrangement of the vehicle including the truck cab and the location of the tiltable truck bed or platform, showing the platform in a stacking position in dotted lines.

Figure 1:
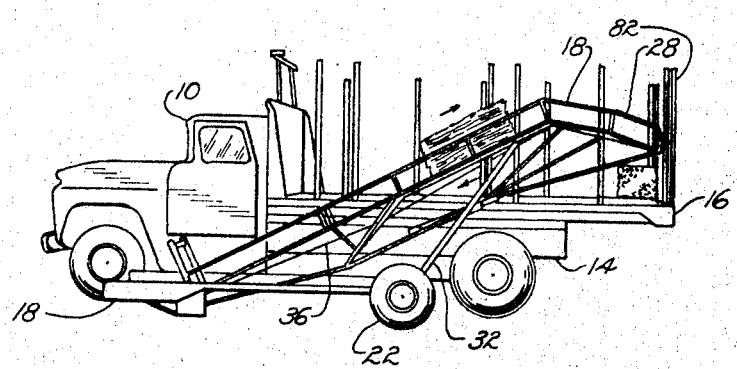
FIGURE 1 is a side elevation of the assembly of the loader conveyor and vehicle embodied in the present invention connected together, showing the conveyor rear end disposed in a lower position.

Referring to the drawings, the reference numeral 10 generally designates a vehicle or truck. The truck is provided with a cab 12 for the truck driver and the usual chassis 14. The vehicle is of any conventional or ordinary type truck now in use and has disposed on the chassis a movable deck or bed or platform 16, as best seen in FIGURE 11.

The truck is adapted to propel or operate a loader conveyor device 18 detachably connected preferably to the driver's side of the truck. The assembly of the vehicle and the loader conveyor is utilized to lift or convey a plurality of individual baled products, such as hay, from the ground, up the loader conveyor and adjacent the vehicle truck platform so that an operator on the platform or deck can easily remove the bales of hay from the loader conveyor and stack them upon the platform. The loader conveyor is provided with vertically adjustable means so that the rear end of the loader conveyor can be disposed at various heights with respect to the ground and adjacent the proper vertical height where the operator on the vehicle platform can easily lift the hay with ease from the conveyor to the platform, depending upon the amount of hay that has been stacked on the truck platform.

Figure 2:
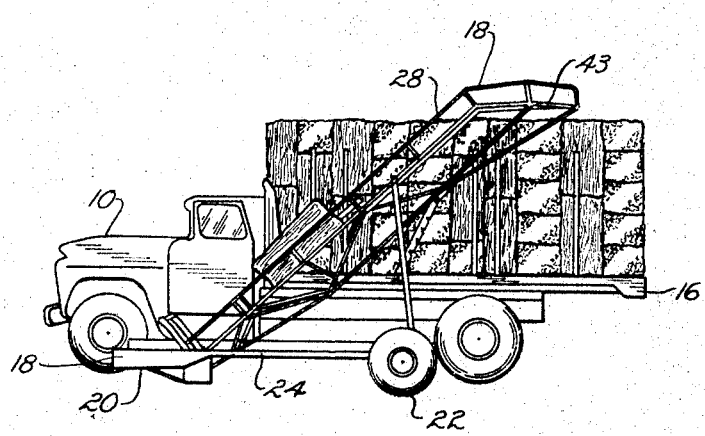
FIGURE 2 is a similar view, but showing the loader conveyor with its rear end positioned at a higher elevation and with a load of baled hay thereon.
Figure 4B:
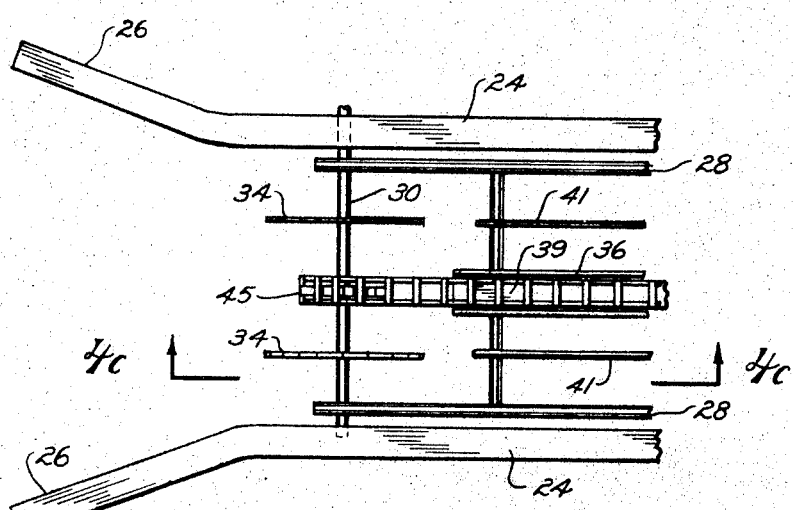
FIGURE 4b is a fragmentary top plan view of the front lower end of the loader conveyor.

The loader conveyor comprises a frame 20 which extends substantially horizontal and is provided with a pair of wheels 22 adjacent the rear end thereof. The frame 20 is provided with two spaced longitudinally extending members 24 and the forward end 26 of these members 24 may be flared outwardly or diverge from each other, as best seen in FIGURE 4b, to receive a bale of hay therebetween. The loader conveyor is provided with a vertically inclined tubular frame 28 that is pivoted adjacent its front end, see FIGURE 4b, about a horizontal shaft 30 extending between the front ends of the longitudinal members 24 so that the vertically inclined frame 28 can be shifted or moved at various vertical heights above the ground, as seen in FIGURES 1 and 2. The rear end of the vertical frame 28 is supported by a pair of inclined members 32 secured to the rear end of the members 24 as seen in FIGURE 4.

Figure 4C:
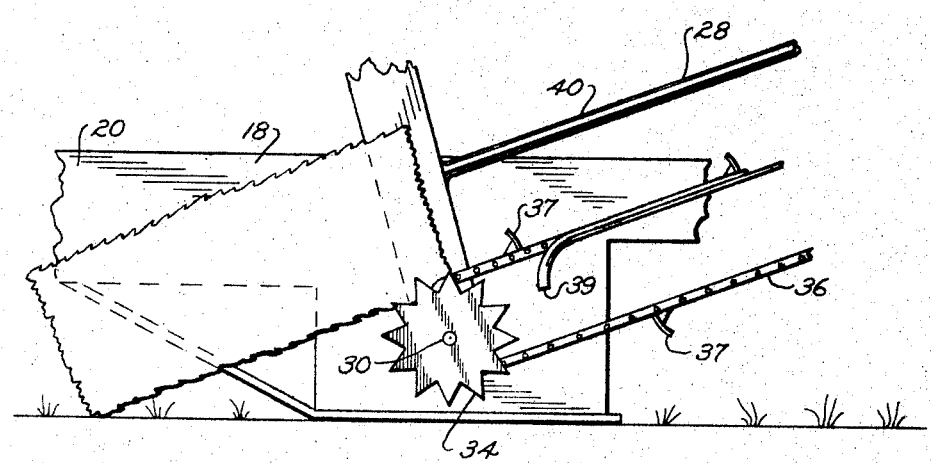
FIGURE 4c is a view taken along line 4c—4c of FIGURE 4b.

The front end of the loader conveyor is provided with two spaced toothed discs 34 as shown in FIGURES 4b and 4c affixed to shaft 30 for rotation therewith that bite into a bale of hay on the ground to pick up the bale and get it started riding upon the conveyor. The particular conveyor utilized in the present invention may be of any well known type. The shaft 30 is rotated by an endless sprocket chain 36 which has a plurality of tines for moving the bale of hay up the conveyor after it leaves the toothed discs. The endless sprocket chain 36 can be driven by any well known means from a power takeoff, not shown, that is connected to the truck engine. The vertically inclined tubular frame 28 is connected to the shaft 30 so that it can readily pivot thereabout, or about the front end of the conveyor as can be seen from FIGURES 1 and 2, with the rear end of the conveyor being adjustable from a low position to a very high position depending upon the load of hay in the truck.

Referring to FIGURES 1, 2 and 4, it will be seen that the endless chain 36 has its upper end disposed on a cross shaft 38 extending between the top pair of longitudinal tubular members 38 of the vertical frame 28.

Figure 2A:
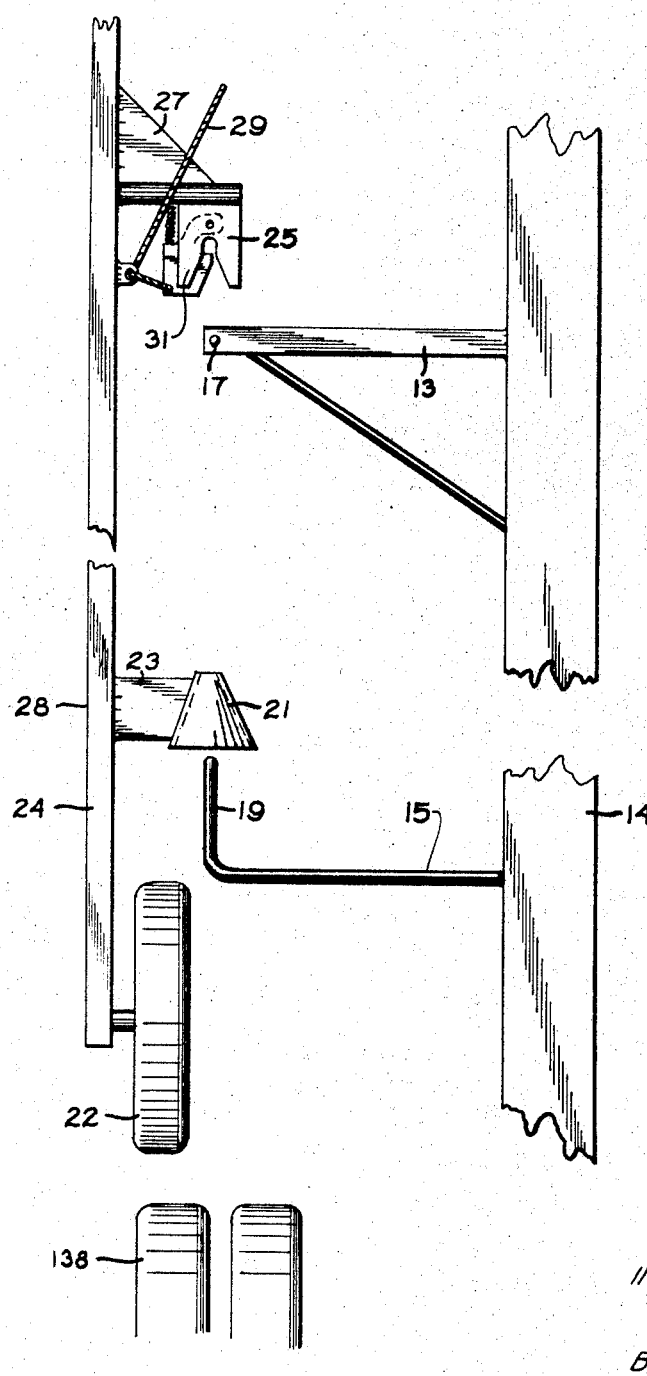
FIGURE 2a is a fragmentary detail plan view of the means for detachably connecting the loader conveyor to the vehicle.

Referring to FIGURE 2a, the loader conveyor is attached to the vehicle as follows. A horizontal spacer bracket 13 and a rear spacer bracket or arm 15 extend from the chassis. Bracket or arm 13 has a vertical pin 17 and arm 15 has a forward extending pin 19. Pin 19 is adapted to extend into a cone member 21 secured to a strut 23 on member 24 on the conveyor. Vertical rod 17 is adapted to be connected to a latch member 25 secured by a brace 27 to member 24. A rope 29 is used to open the movable spring-biased jaw member 31 when it is desired to disconnect the conveyor from the vehicle.

The loader conveyor sprocket chain 36 has a plurality of tines or lugs 377 (FIGURES 4b, c and d) for pulling the bale of hay up the conveyor. The frame 28 has secured thereto a channel member 39 below and adjacent the upper part of chain 36 to support the chain and bale of hay. Also, two spaced balancing rails 41 are secured to the frame on opposite sides of channel 39 to balance the bale and form a support for it up the conveyor. The rear end of the conveyor is provided with a discharge platform 43 from which the operator can lift the bales to stack them on platform 16. Chain 36 is carried on sprockets 45 and 47 adjacent opposite ends thereof, and sprocket 46 is fixed to shaft 54.

Figure 3:
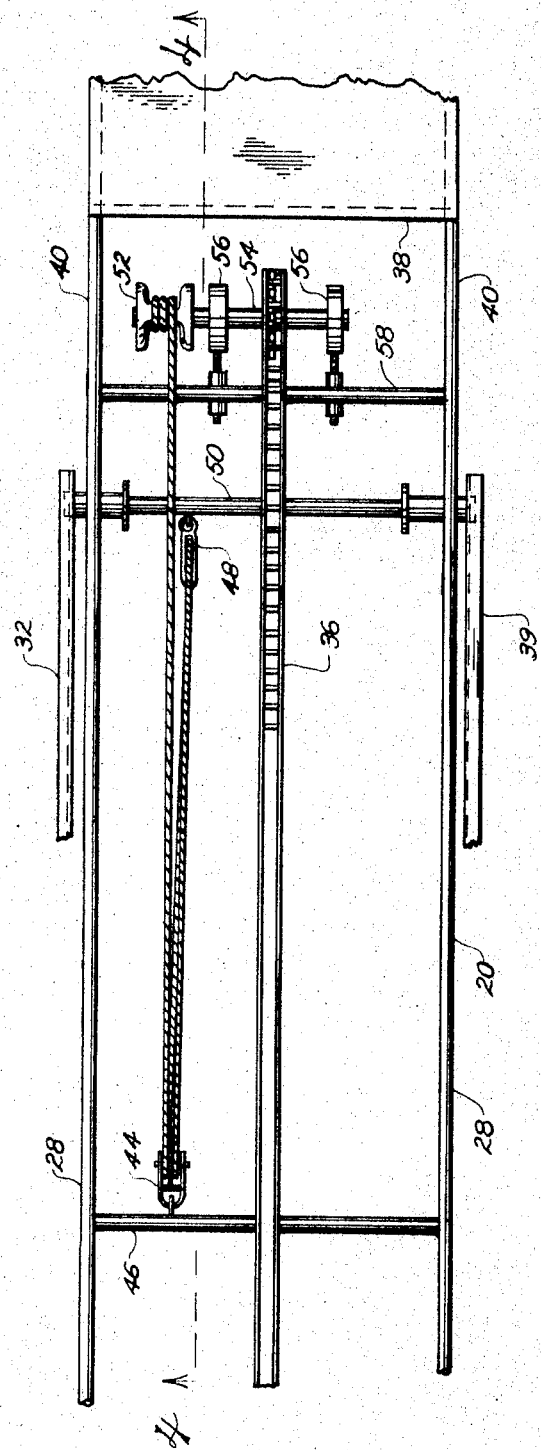
FIGURE 3 is a fragmentary top plan view of the loader conveyor and the means for lowering and raising the rear end thereof to various heights.

The vertical inclination of the frame 28 is adjusted and the rear end of the frame 28 is thereby raised or lowered by a block and tackle system 42 consisting of a pulley 44 connected to a cross shaft 46 extending between the upper members 40 of frame 28 and another pulley 48 connected to another cross shaft 50 disposed rearwardly of the shaft 46, as seen in FIGURES 3 and 4. The shaft 50 extends beyond the outer sides of the members 40 as seen in FIGURE 3 and is journalled in sleeve type rollers connected to the upper end of the inclined members 32.

A spool of windlass 52 is fixed to a shaft 54 disposed in bearings 56 as best seen in FIGURES 3 and 4, for carrying the loops of the rope connected to the pulleys 44 and 48 for adjusting the vertical height of the loader conveyor. The bearings 56 are carried by a cross shaft 58 connected to the members 40. The rear end of the rope is provided with a handle 60 and is looped over the spool or windlass 52 so that when a person pulls on the handle 60 the loops on the spool 52 will tighten thereon and create a windlass type of transmission of power through or to the block and tackle, which will continue as long as a pull or force is applied to the rope handle 60. The spool which is fixed to the shaft 54 is preferably driven by power transmitted from the sprocket chain to a gear connected to the shaft 54, although it may be driven by any well known means. The winding up of the loops of rope on the spool 52 will cause the loader conveyor to move in a direction along the path of direction 62 indicated in FIGURE 4 so as to pivot the members 32 and the brackets 64 about the wheel axle of the wheels 22. The lower members 66 of the frame 28 are provided with notched bars 68 so that once the desired vertical height of the loader conveyor is reached the conveyor can be held in that position by the cross bar 70 being inserted in one of the notches of the bar 68.

Thus, with the loader conveyor embodied in the present invention the vehicle can be moved along a hay field and the individual baled hay bales can be picked up by the rotating discs 34 and fed up the loader conveyor so that an operator on the platform of the truck can lift the bale from the loader conveyor and stack it in a pattern as desired. It will also be apparent that with the mechanism for adjusting the vertical height of the loader conveyor by raising and lowering the rear end of the conveyor that the bales can be picked up and lifted to the best height for easy handling. Thus there is no need to drag the bales off of a platform that is set too high, or stooping to reach bales that are too low. As the load builds up, an easy pull of the rope handle applies the power to raise the loader conveyor and keep the platform of the conveyor at a convenient working level in accordance with the stack being formed in the truck platform thus eliminating hard, slow work of lifting and climbing.

Unusual pick-up discs 34 insure a positive, past pick up of the tight or loose bales of hay and eliminate the bothersome, inefficient paddles used in many cases heretofore. The two wheel ground drive of the discs always gives a positive and uniform lift.

Figure 5:
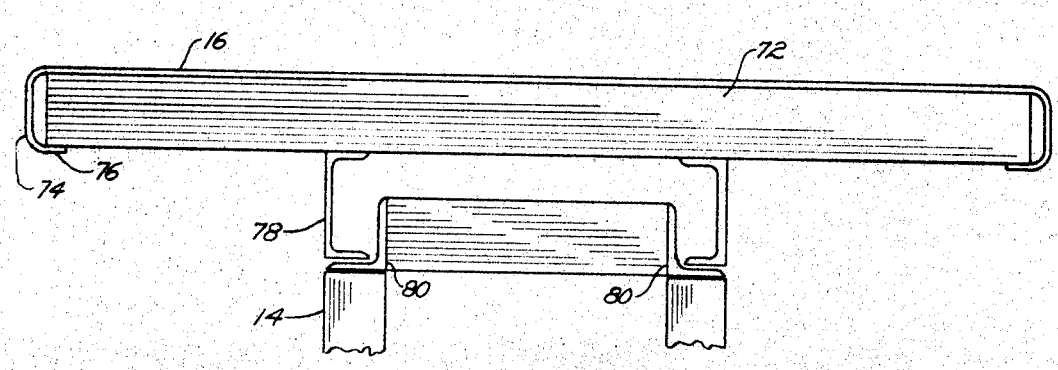
FIGURE 5 is a transverse view of the vehicle platform or deck and the truck chassis and longitudinal members and sub-frame.

Referring to FIGURES 5 and 11, it will be seen that the platform or deck 16 of the truck is provided with a plurality of spaced transverse members or struts 72 supporting the deck 16. It will also be noted that the opposite sides of the deck 16 are rolled downwardly at 74 and extend inwardly at 76 of the struts 72.

The transverse struts 72 are secured to two spaced longitudinal channel shaped members 78 as best seen in FIGURE 5, which members 78 are supported on and carried by L-shaped sub-frame longitudinal members 80. The sub-frame members 80 in turn are secured to the top of the truck chassis 14. The provision of the sub-frame 80 as an L-shaped member with the longitudinal members 78 being disposed to be carried or supported by the horizontal leg of the sub-frame 80 allows relatively low positioning of the vehicle deck or platform 16, as can be seen from FIGURE 5.

Figure 6:
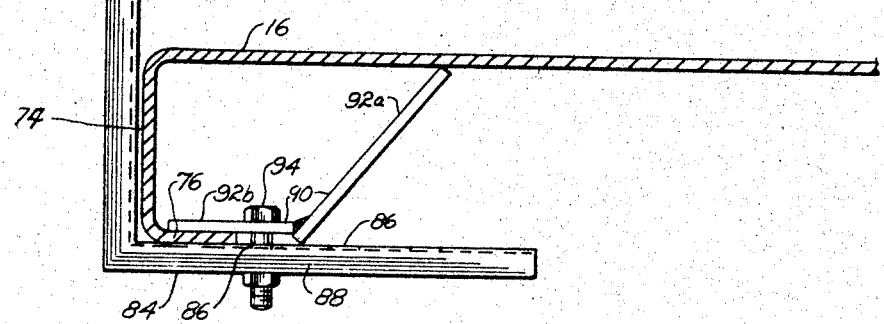
FIGURE 6 is a detail view of a portion of the vehicle platform or deck and the means provided for adjusting the side post or side stakes and the widths of the stakes and the vehicle bed or deck.

Referring to FIGURE 6, there is shown the means of securing a side post or vertical member 82 to the opposite sides of the platform or deck 16. The side posts 82 are disposed in spaced relationship with each other around the opposite sides and the rear of the platform 16. The stakes 82 are provided with a lower horizontal inwardly extending leg 84 having two spaced holes 86 in alignment with each other and spaced apart by the distance 88. A clamp member 90 having a diagonally extending upward leg 92a and a horizontal leg 92b, respectively, are secured to the inner edge 76 of the side 74 and the underside of the deck 16. A bolt member 94 is threaded through the opening 86 in the post or stake 82 so as to securely position it in place. The post 82 may be disposed in spaced relationship away from the side 74 of the deck 16 if desired by securing the bolt 94 through the inner hole 86. Thus the width of the platform, or the useable space enclosed within the post 82 can be enlarged if desired by connecting the stakes to the inner holes 86 of their horizontal leg 84.

Referring to FIGURE 11, it will be noted that the platform 16 is pivotally connected to the rear end of the chassis 14 by a bracket 98 secured to the chassis by welding or similar means and provided with a pivot pin 100 extending through the bracket and in turn connected through the longitudinal member 78. Thus, the platform 16 is pivoted at or toward its rear end to the rear of the chassis 14 for tiltable or dumping movement with respect to the chassis and the cab of the vehicle.

Referring to FIGURE 7, two spaced transverse channels 102 have secured thereto by welding or similar means two brace members 104 extending therebetween for connecting thereto a hydraulic ram assembly or cylinder 106. The brackets 104 are preferably secured to the facing sides of the longitudinal members 78, and the brackets 104 also extend above the upper edge of the longitudinal members 78 and in the space between the lower surface of the platform 16 and the uper edge of 78, or in substantially horizontal alignment with the sides 74 of the platform 16.

The lower end of the cylinder or ram 106 is pivotally connected by any well known means such as a pin or the like, as best seen in FIGURE 11, to the chassis 14. Thus, the upper end of the ram is provided with the extensible plunger 108 while the lower end of the ram or cylinder 106 is fixed to the chassis and forms a point about which the ram and plunger 108 pivot when moving from the horizontal position shown in FIGURE 11, which is the loading position, to the dumping or discharging position indicated in dotted lines in FIGURE 11. The plunger 106 is disposed adjacent the rear wheels as best seen in FIGURE 11, of the vehicle, and as best seen in FIGURE 7a the distance indicated as B between the pivot pin 110 connecting the front end of the plunger 108 to the bracket platform and the pivot point or pin 100 is substantially greater than the distance indicated as A between the pivot pin 112 connecting the ram 106 to the chassis and said pivot pin 100.

In a truck bed or platform that tilts for unloading, the common arrangement or the conventional arrangement is to have the base of the cylinder or ram assembly at a greater distance from the pivot point of the truck bed or platform, than the distance from the top of the ram or cylinder to the pivot point. It will be noted in the structure of the present invention that the base of the cylinder assembly or ram 114, see FIGURES 7 and 7a, is closer to the pivot point or pin 100 than the top of the ram 116 to the pivot point or pin 100. With this structure the rams or cylinders 106 are able to tip the platform or deck from its horizontal loading position to its discharge or stacking position because of the relative locations of the pivot point, in one stroke. The two rams 106 are also able to lift the front end of the load in spite of the apparent disadvantage resultant, forcewise.

Referring to FIGURE 7 it will be noted that the pivot pin 112 which is shown in solid lines and the solid line ram 114 can be pivotally connected to the chassis as indicated at C in dotted lines, or below the normal connection for attachment to the chassis. In the alternate position of the ram assembly as indicated at C, the deck tilts up less than to the vertical plane for dumping heavier loads. The rams or cylinders can be easily changed from one position to the other by merely removing the pin at the base of the ram and repinning it in the alternate position.

Referring to FIGURE 7, the platform and the ram 106 shown in solid lines therein in the loading position or with the deck in the horizontal position, is moved from that position, with the plunger 108 in a completely retracted position to the dotted line position indicated as D with the plunger 108 fully extended in order to dump or stack a load of hay that has been loaded onto the platform 16. It will be noted that in its dumping position as indicated at D, that the platform 16 has moved past the vertical plane and is tilted more than 90° with respect to its loading position, at which it is substantially horizontally disposed. The plungers or rams are preferably hydraulically operated and are preferably double-acting, although it is still within the purview of the invention to utilize a pneumatic pressure or other similar means if desired. The pivoting point 100 of the deck 16 is positioned or located so that the rear or back end of the platform or deck lightly touches the ground when it is tipped or tilted to the stacking position, as best seen in FIGURE 7.

It will be noted in FIGURE 7 that the rear stakes 82 of the platform are pivotally connected by a pin member 118 and extends through a large hole 120 or opening in the platform which is substantially of greater dimension than the outer surface or dimension of 82 so that it allows the stakes to touch the ground when the platform 16 is tilted or tipped past the vertical plane from its horizontal or level position. In other words, there is a certain amount of play left with respect to stakes 82 because of tipping the platform past the vertical and the stakes will not be bent or inadvertently dig into the ground.

Referring to FIGURES 8 and 11, the vehicle is provided with push off cylinders or ram means 122 connected by bracket members 124 to the opposite sides of the truck chassis 14. The cylinders 122 are connected to the bracket 124 by a pivot pin 126 and as best seen in FIGURE 8, a piston rod 128 extends out of the rear end of the cylinder 122 and is positioned therein for being completely extended to a fully extended position as shown in dotted lines in FIGURE 8. The solid line showing of the piston rod or plunger 128 in FIGURE 8 illustrates the piston rod in its fully retracted position.

To the rear ends of the piston rods 128 is pivotally connected by pin means 130 push off members 132, which can be substantially U-shaped members with the legs of the members having the pins 130 extending therethrough. To the ends of the members 132 is secured a rectangular member 134 for securing thereto an elongated substantially rectangular push off plate 136. The plate 136 extends transversely of the width of the platform and is positioned longitudinally of the truck bed, rearwardly of the vehicle wheels 138 as best seen in FIGURE 11. The push off plate 136 forms part of the platform 16, as best shown in FIGURES 8 and 11 when the platform is disposed in its horizontal or level position. The plate 136 has its front and rear edges supported on spaced transverse members 140 secured to the underside of platform 16. The cylinders 122 are preferably hydraulic cylinders and are provided with hydraulic control means not forming part of the invention which permit the plunger or piston rod 128 to float as the platform 16 is being moved from its level position to its stacking position shown in FIGURE 7. There are two push off cylinders 122 and they are connected together to operate in unison by virtue of the plate member 136 secured to the pivot pins 130 through the push off members 132.

Once the loaded truck and the platform 16 has been filled and it is desired to remove the load of baled hay onto the ground, after the tilting cylinders 106 and their plungers 108 have been fully extended so as to position the platform in the position shown in FIGURES 7 and 11, the stack of hay is then pushed onto the ground and off of the platform and out from between the stakes 82 on the platform by the pusher plate 136 being moved to its fully extended position. The push off plate 136 pushes against the lower portion of the stacked hay on the platform 16 and the stacked hay is forced off of the rear stakes 82 by the push off plate 136 and the piston rods 128 causing the truck to move forwardly or away from the baled hay on the platform 16. This causes the truck and the rear stakes 82 to slide out from under the load of hay being carried on the platform 16. This is illustrated in FIGURES 7, 8 and 11.

When the load has been removed from the platform 16 the piston rods 108 are then retracted and the platform is returned to its horizontal or level position. During this movement the push off plate 136 and its plungers 128 have been retracted so that the plate 136 will then cover the opening in the platform 16 between the members 140 and serves as a cover when the push off plungers are retracted and the truck is used for carrying a load thereon.

Referring to FIGURE 9, there is shown therein the method of loading a previously stacked and discharged load of hay from the ground back onto the platform 16 of the vehicle for removal to another location. The load of hay is generally designated 144. To accomplish this, the vehicle is backed up adjacent the load 144 of hay to be retrieved and replaced on the platform 16. Thereafter, the platform 16 is tilted to a point past the vertical plane so that the stakes 82 are disposed on the ground, as best seen in FIGURE 10c. The push off cylinders and the piston rods 128 are then extended to their fully extended position as seen in FIGURE 9. The push off plate 136 is provided with a special retrieving bar 146 that is bolted to the push off member 136 and extends transversely of the platform 16 and is substantially as wide as the hay stack to be reloaded. The opposite ends of the retrieving bar 146 are provided with chain members 148 secured thereto. The rear end of the load of hay 144 is provided with steel corner protector members 148 which may be angle irons. The angle irons 148 are vertically disposed adjacent the rear end of the corners as seen in FIGURE 9, and the chain 148 is extended from one end of the retrieving bar 146 around the angle irons 148 and have their oposite ends fixed to the opposite ends of the retrieving bar 146. The chain is made taut so that there is no slack remaining in the chain. After the chain has been wrapped around the hay load as described, the piston rods 128 of the push off cylinders are retracted. It will be noted that the retrieving bar 146 is provided with vertical struts, only one of which 150 is shown, connected thereto. The lower end of the struts 150 are connected to a transversely extending tubular member 152 which slides along the surface of the rear stakes 82 to prevent the push off cylinder piston rods 128 from being bent downwardly by the force transmitted thereto through the diagonally extending chain 148. The stacked load of hay gradually rolls over the rounded end 154 of the stakes 82, as best seen in FIGURE 10c, and the piston rods 128 are retracted until the entire hay load 144 is disposed within the stakes or posts of the platform 16. Once the load is sufficiently positioned within the stakes 82, the chain 148 is removed from the retriever bar 146 after the platform 16 has been lowered to its level position or its transporting position.

Thus, the present invention provides a bale handling system that can handle any type of baled products such as hay and the like in which the individual baled units can be automatically picked up from the ground and raised to a desired level or height adjacent a vehicle platform so that a person on the truck platform may readily stack the bales one upon the other, and the entire load of baled products or hay can thereafter be discharged or dumped after being carried to a predetermined location.

The present invention further provides a bale handling system in which the baled hay can be retrieved and replaced upon the platform of the vehicle and thereafter hauled or transported to another location. The present invention further provides a loader conveyor having toothed rotating discs that boost the bales of hay onto the conveyor and the loader conveyor is provided with means for adjusting the vertical rear height of the inclined loader conveyor by pulling upon a rope so that power is transmitted to a windlass type drum or spool which operates a block and tackle, which in turn raises the rear end of the loader conveyor or conveyor elevator. The present invention further provides alternate pivot pin means or an alternate position for the hydraulic lifting rams which are connected to the chassis so that the truck platform or bed can be used for discharging or dumping heavier loads without lifting the platform to a vertical position. The present invention further provides a means and method for retrieving a discharged load of hay or baled load from the ground and a method of replacing it or reloading it upon the platform so it can be hauled to another location.

Inasmuch as various changes may be made in the form, location, and relative arrangement of the several parts of the invention without departing from the essential characteristics of the invention, it will be understood that the invention is not to be limited except by the scope of the appended claims.

What is claimed is:

1. A vehicle for transporting baled products and the like comprising a chassis with longitudinal members and a horizontal platform supported thereon, rearwardly extending bracket members on the rear portion of said chassis, said bracket members extending above said chassis, pivot pins in said bracket members extending therethrough and through said longitudinal members forming a pivot point for pivoting said longitudinal members and platform in a clockwise direction about said point, a ram means consisting of at least one cylinder and plunger disposed so said plunger extends forwardly of said cylinder with said plunger and cylinder disposed at an angle with respect to the horizontal plane of said horizontal platform and with the forward facing end of said cylinder being disposed at a higher elevation than its rear end, said chassis having at least two spaced opening means for selective attachment of the rear end of the cylinder to said chassis at alternate positions, whereby said platform is swingable from a horizontal position and to a vertical position and past the vertical plane disposed substantially 90 degrees from the plane of the chassis.

2. The vehicle of claim 1 wherein there are at least two cylinders and plungers.

3. The vehicle of claim 2 wherein said platform is provided with vertical spaced posts on its rear edge disposed thereon to permit lateral play when said platform is tilted past the vertical plane.

4. The vehicle of claim 3 wherein said rear posts are rounded on their ends to permit retrieving of a stacked load of baled products.

5. The vehicle of claim 4 wherein said platform is provided with hydraulic pusher means and opening means in said platform, and said pusher means are operatively connected to said chassis for pushing material from said platform, and are disposed to extend through said opening means.

6. The vehicle of claim 5 wherein retriever means are provided for connection to said pusher means for retrieving material onto said platform.

References Cited

UNITED STATES PATENTS

| | | | |
|---|---|---|---|
| 2,578,802 | 12/1951 | Heidrick et al. | 214—512 |
| 2,623,602 | 12/1952 | Double | 298—22 XR |
| 2,803,847 | 8/1957 | Hobbs | 298—22 XR |
| 2,726,115 | 12/1955 | Babcock et al. | 214—501 XR |
| 2,781,924 | 2/1957 | Hughes | 214—77 |
| 3,013,682 | 12/1961 | Unruh | 214—501 |
| 3,186,567 | 6/1965 | Blair | 214—510 |

ALBERT J. MAKAY, *Primary Examiner.*

U.S. Cl. X.R.

254—124; 298—22